United States Patent [19]
Thompson et al.

[11] Patent Number: 5,858,081
[45] Date of Patent: *Jan. 12, 1999

[54] KAOLIN DERIVATIVES

[75] Inventors: John Gerard Thompson, Page; Ian Donald Richard Mackinnon, Ellengrove; Sasha Koun, Cook; Neil Gabbitas, Kambah, all of Australia

[73] Assignee: The University of Queensland, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 557,176

[22] PCT Filed: Jun. 16, 1994

[86] PCT No.: PCT/AU94/00323

§ 371 Date: Jan. 17, 1996

§ 102(e) Date: Jan. 17, 1996

[87] PCT Pub. No.: WO95/00441

PCT Pub. Date: Jan. 5, 1995

[30] Foreign Application Priority Data

Jun. 17, 1993 [AU] Australia ................. PL9431

[51] Int. Cl.$^6$ ............ C04B 14/10; C01B 33/26; C01B 33/40
[52] U.S. Cl. ............ 106/486; 106/487; 501/141; 423/118.1; 423/328.1; 423/329.1; 524/447
[58] Field of Search ............ 106/486, 487; 501/141, 145, 146; 423/118.1, 328.1, 329.1; 502/80, 63; 524/447

[56] References Cited

U.S. PATENT DOCUMENTS

| | | |
|---|---|---|
| 3,586,523 | 6/1971 | Fanselow et al. . |
| 3,663,456 | 5/1972 | Upson et al. . |
| 3,887,454 | 6/1975 | Hickson ............... 502/63 |
| 3,899,343 | 8/1975 | Lim ...................... 501/487 |
| 3,939,246 | 2/1976 | Rollmann ............ 423/710 |
| 4,626,290 | 12/1986 | Nakazawa et al. ..... 501/486 |
| 4,952,544 | 8/1990 | McCauley ............ 502/63 |
| 5,145,816 | 9/1992 | Beck et al. ............ 502/60 |
| 5,308,808 | 5/1994 | Gregar et al. ........ 106/486 |

FOREIGN PATENT DOCUMENTS

| | | |
|---|---|---|
| 917630 | 12/1982 | Canada . |
| 499887 | 1/1976 | U.S.S.R. . |
| 623825 | 9/1978 | U.S.S.R. . |
| 1390185 A1 | 4/1988 | U.S.S.R. . |
| 1724661 A1 | 4/1992 | U.S.S.R. . |
| 1803178 A1 | 3/1993 | U.S.S.R. . |
| 1181491 | 2/1970 | United Kingdom . |

OTHER PUBLICATIONS

Mank, *Ukranian Chemical Journal*, vol. 49, No. 7, pp. 693–698 (1983). (no month).

Vdovenko et al., *Ukranian Chemical Journal*, vol. 50, No. 10, pp. 1037–1041 (1984). (no month).

Thompson, *Clays and Clay Minerals*, vol. 40, No. 4, pp. 369–380 (1992). (no month).

*Primary Examiner*—Michael Marcheschi
*Attorney, Agent, or Firm*—Griffin, Butler, Whisenhunt & Szipl, LLP

[57] ABSTRACT

Amorphous derivatives of kaolin group minerals characterized by high specific surfaces and/or high cation exchange capacities and a $^{27}$AL MAS NMR spectrum having a dominant peak at about 55 ppm relative to $Al(H_2O)_6^{3+}$. Such derivatives are prepared by reacting a kaolin group mineral with a reagent, such as, an alkali metal halide or an ammonium halide which converts the majority of the octahedrally coordinated aluminum in the kaolin group mineral to tetrahedrally coordinated aluminum. Such derivatives show high selectivity in its cation exchange towards the metals: $Pb^{2+}$, $Cu^{2+}$, $Cd^{2+}$, $Ni^{2+}$, $CO^{2+}$, $Cr^{3+}$, $Sr^{2-}$, $Zn^{2+}$, $Nd^{3+}$ and $UO_2^+$.

18 Claims, 18 Drawing Sheets

KAOLIN DERIVATIVES

This application is a Section 371 application of International Application No. PCT/AU94/00323, filed Jun. 16, 1994.

This invention relates to derivatives of kaolin group minerals and is particularly concerned with such derivatives which have high specific surfaces and/or high cation exchange capacities.

BACKGROUND OF THE INVENTION

The kaolin group minerals comprise kaolinite, nacrite, dickite and halloysite, and are among the most common clay minerals in nature. They have a 1:1 layered structure, that is, each layer consists of one tetrahedral silicate sheet and one octahedral sheet, with two-thirds of the octahedral sites occupied by aluminium. Kaolinite, nacrite and dickite all have the ideal chemical composition:

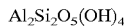

$Al_2Si_2O_5(OH)_4$

They differ from one another only in the manner in which the 1:1 layers are stacked. Halloysite, in its fully hydrated form, has the ideal chemical composition:

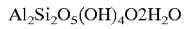

$Al_2Si_2O_5(OH)_4 \cdot 2H_2O$ and differs from the other three members of the group by including molecular water in the interlayer.

Of the kaolin group minerals, kaolinite is the most abundant and has received most attention in terms of its structure, properties and industrial applications. However, because of its close similarity with the aforementioned polytypes, many of the properties and uses described for kaolinite apply equally to the other polytypes. Consequently, for the purposes of expediency, the following disclosure will be restricted primarily to kaolinite and halloysite but it should be borne in mind, as it will be readily appreciated by those skilled in the art, that the invention applies equally to nacrite and dickite.

Naturally occurring kaolins typically have a wide range of particle sizes, particle crystallinity, minor element composition(s) and chemical reactivity for intercalation reactions. Kaolins sorted into a size range of 0.5–2.0 mm typically have a specific surface of about 5 $m^2g^{-1}$ and a cation exchange capacity of 10 meq./100 gm or less. These, and other properties, such as opacity and rheology, make kaolins suitable for a wide range of uses including paper coatings and fillers, pottery, porcelain and sanitaryware production and fillers in paints and rubbers. These properties however do not allow kaolins to be readily utilised in other uses as described hereinafter. However, if their specific surface and/or cation exchange capacities could be increased, their usefulness would be increased and thus they could then be used in many other applications including use as catalysts, metal scavengers, carriers and absorbents. In view of this, there has been considerable and ongoing interest in finding a process for delaminating or increasing the surface area of the layered kaolin structure as this would have the potential of making available for reaction large surface areas between the layers. To date, delamination has not been demonstrated despite substantial research on the intercalation of kaolinite and its polytypes. Recent research by N. Lahav [(1990)], Clays and Clay Minerals 38, 219–222)] suggested a stable suspension of delaminated kaolinite which had been treated with dimethylsulfoxide and ammonium fluoride in aqueous solution. The result was inferred on the basis of change of particle size and there was no evidence of the independent existence of the kaolinite reaction product.

It is therefore an object of the present invention to provide derivatives of the kaolin group minerals which have higher specific surfaces and/or higher cation exchange capacities than the kaolin group minerals per se.

BRIEF DESCRIPTION OF THE INVENTION

According to one aspect of the present invention, there is provided a process for the preparation of a kaolin amorphous derivative which process comprises reacting a kaolin group mineral with a reagent which converts the majority of the octahedrally co-ordinated aluminium in the kaolin group mineral to tetrahedrally co-ordinated aluminium.

BRIEF DESCRIPTION OF THE DRAWINGS

FIG. 4B shows KAD grains after reaction according to Example 2. Both images are at 250,000×magnification.

DESCRIPTION OF PREFERRED EMBODIMENT

Figure 1A:
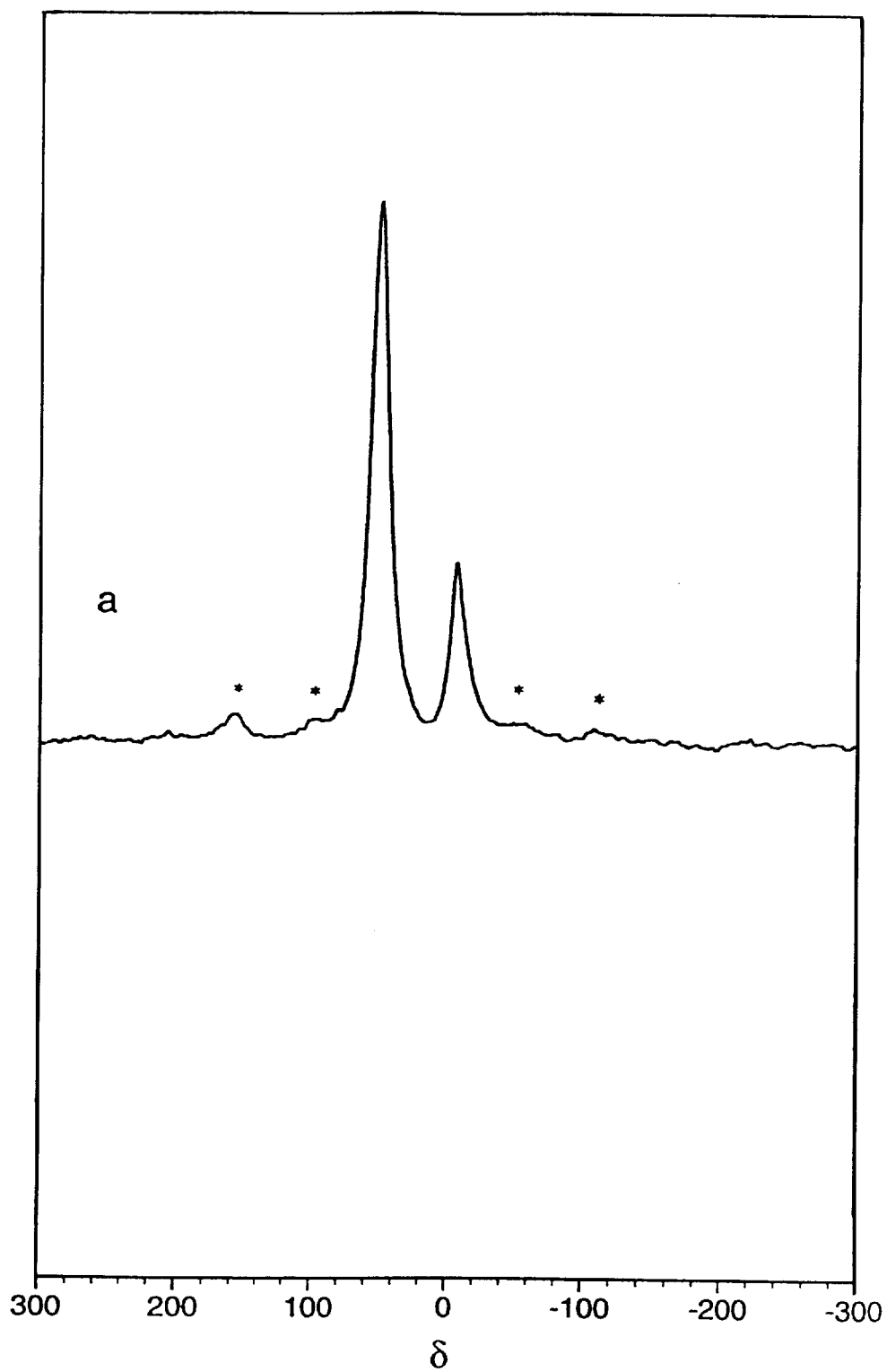
FIGS. 1A and 1B: $^{27}Al$ magic angle spinning NMR spectra of KAD prepared from Weipa kaolinite according to Example 1, FIG. 1A after rinsing with water and FIG. 1B after rinsing with KOH. Spinning side bands are indicated by *.

The preferred reagent is an aqueous alkali halide, wherein the mole ratio of alkali metal halide (MX) to the kaolin group mineral ($Al_2Si_2O_5(OH)_4$) is suitably from 5 to the saturation concentration of the alkali metal halide. This process need not be restricted to a homogeneous, single-phase kaolin, in that the kaolin, which may contain impurity phases such as anatase, ilmenite, geothite, quartz or cristobalite, when processed in a similar manner may also result in a material comprising predominantly a kaolin amorphous derivative.

Kaolins may deviate significantly from the ideal stoichiometry as noted above, for example, by containing up to 2 weight percent Fe-oxide. The above described process for formation of a kaolin arorphous derivative is also applicable to kaolins which contain significant amounts of cations, such as $Fe^{2+}$ or $Fe^{3+}$, within the structure or on the surface of individual crystals.

The preferred mole ratio of alkali halide to kaolin is in the range of 15 to 25.

Reaction is suitably carried out at an elevated temperature for a sufficient period of time to enable conversion to the kaolin amorphous derivative. Standard pressure conditions are satisfactory for the conversion reaction. However, the transformation of a compound with a predominantly octahedrally-coordinated aluminium to an amorphous derivative with predominantly tetrahedrally-coordinated aluminium may occur by a suitable combination of temperature, pressure and time of reaction given the appropriate reactants. For example, a kaolin amorphous derivative may be formed from a kaolin by reacting with an alkali halide at temperatures up to 300° C. for a time period up to 100 hours. Alternatively, a kaolin and alkali halide may be reacted for shorter periods of time at elevated pressures (up to 1 kbar).

Preferably, the kaolin is reacted by completely dispersing it in the aqueous alkali metal halide solution and heating the dispersion to a temperature between 70° C. and 150° C. at atmospheric pressure for a period of between 1 minute and 100 hours until complete conversion has occurred. The excess alkali metal halide is then removed from the reaction mixture by rinsing with water until no halide can be detected in the elute. The resultant solid contains a mixture of kaolin amorphous derivative and relatively insoluble halide byproducts. The halide byproducts are removed by rinsing the solid mixture with alkali hydroxide to leave substantially pure derivative.

The reaction conditions may be such that only partial modification of the individual kaolin layers occurs without their complete disintegration or dissolution. The inner surfaces of some of the "layers" remain exposed following the chemical modification resulting in a substantial increase in specific surface compared with unreacted kaolin.

The dried kaolin amorphous derivative prepared by the specific procedure above is a white powder having a specific surface of between 45 $m^2g^{-1}$ and 400 $m^2g^{-1}$ and more preferably between 100 $m^2g^{-1}$, and 200 $m^2g^{-1}$ i.e. manyfold that of the starting material. A typical chemical composition of this kaolin amorphous derivative when the alkali metal halide is KF, as determined by a combination of energy dispersive X-ray spectroscopy in the scanning election microscope, wet chemical analysis and electron microprobe, is:

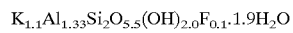

$$K_{1.1}Al_{1.33}Si_2O_{5.5}(OH)_{2.0}F_{0.1} \cdot 1.9H_2O$$

The composition of the kaolin amorphous derivative depends on the composition of the starting materials, whether the reaction has gone to completion (i.e. how much kaolin starting material remains) and to what extent reaction byproducts have been removed by rinsing with water and alkali hydroxide. If we assume that no mineral impurities, as mentioned above, are present and that the reaction product has been thoroughly rinsed, then the composition of kaolin amorphous derivative will normally fall within the following range:

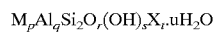

$$M_pAl_qSi_2O_r(OH)_sX_t \cdot uH_2O$$

where M is an exchangeable alkali metal or ammonium cation, X is a halide, $0.5 \leq p \leq 2.0$, $1.0 \leq q \leq 2.2$, $4.5 \leq r \leq 8.0$, $1.0 \leq s \leq 3.0$, $0.0 \leq t \leq 1.0$ and $0.0 \leq u \leq 3.0$.

The exchangeable cation present determines the cation exchange capacity of the above composition, which ranges from 50–450 meq per 100 g As measured by exchange of ammonium or metal cations from an aqueous solution. More preferably the cation exchange capacity is about 300 meq per 100 g.

The structure and morphology of the abovementioned kaolin amorphous derivative has been analysed by NMR (nuclear magnetic resonance), XRD (X-ray diffraction), SEM (scanning electron microscopy), and TEM (transmission electron microscopy).

Solid state NMR is able to provide information on the local chemical environment of the magnetic nuclei. In particular, $^{27}Al$ NMR is sensitive to the co-ordination environment, that is, whether the atom is 4, 5 or 6-co-ordinated, whereas, for framework aluminosilicates $^{29}Si$ NMR can also give information about the number and occupation of neighbouring tetrahedral sites, e.g. it can resolve Si(nAl) n=0–4.

Figure 1B:
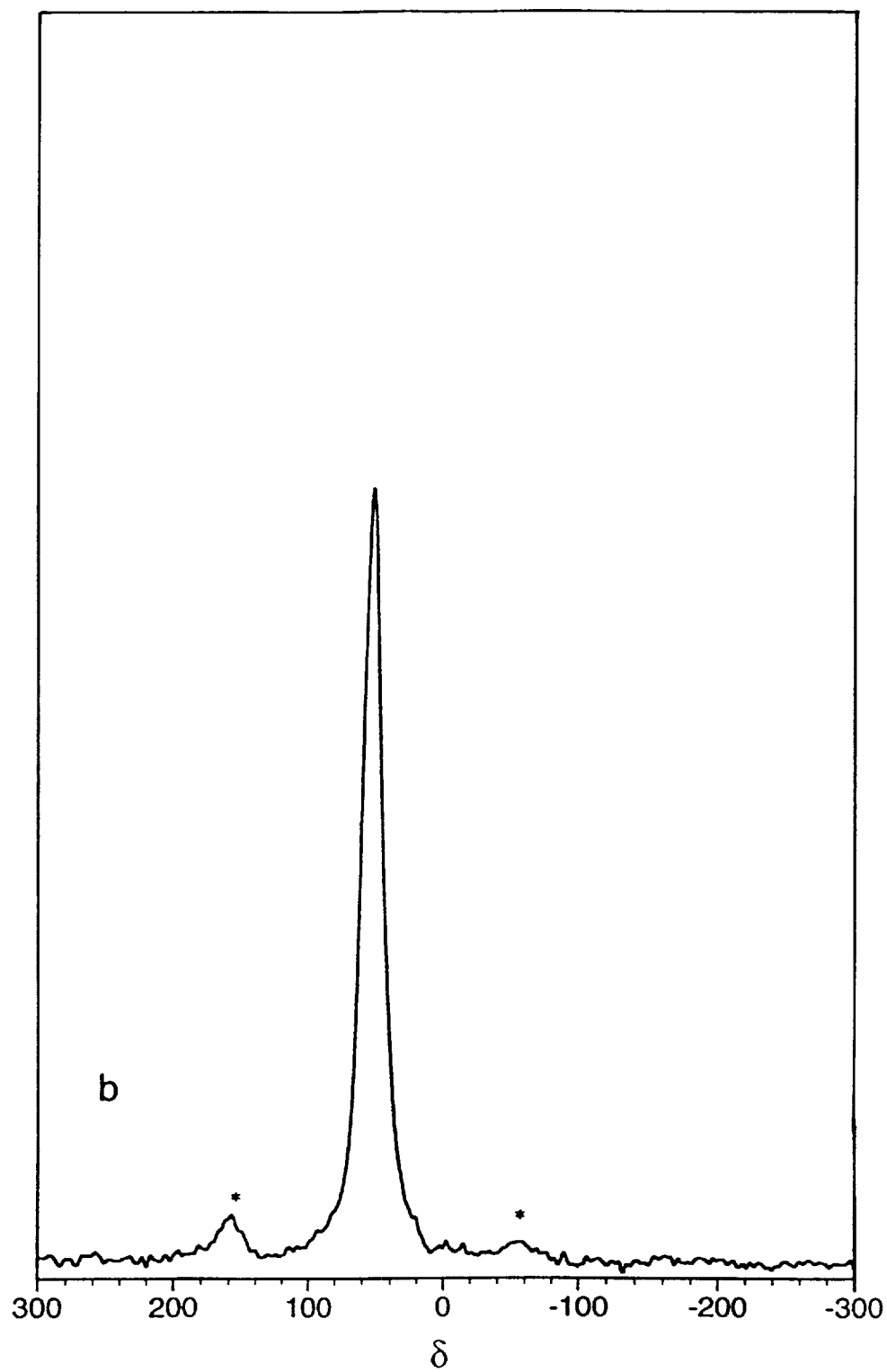

The $^{27}Al$ Magic Angle Spinning (MAS) Nuclear Magnetic Resonance (NMR) spectrum for the kaolin amorphous derivative generally gives a dominant peak centered on ~55 ppm relative to $Al(H_2)_6^{+3}$ (FWHM~16 ppm) (see FIG. 1b), which is interpreted as tetrahedrally co-ordinated Al. This is in contrast to the $^{27}Al$ MAS NMR spectrum for kaolinite which gives a single resonance at ~0 ppm (FWHM~20 ppm), which corresponds to octahedrally co-ordinated Al.

Figure 2A:
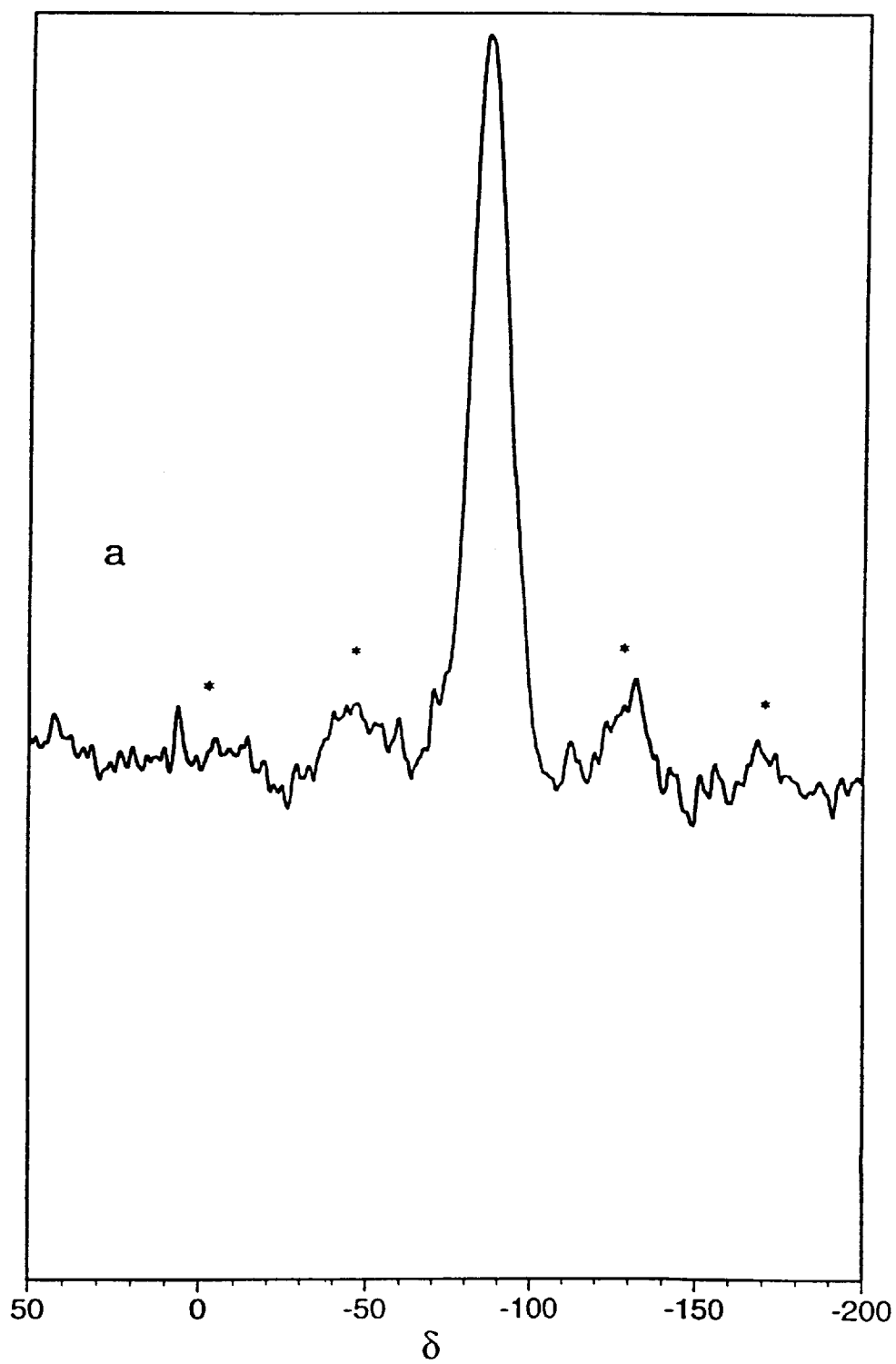
FIGS. 2A and 2B: $^{29}Si$ magic angle spinning NMR spectra of KAD prepared from Weipa kaolinite according to Example 1, FIG. 2A after rinsing with water and FIG. 2B after rinsing with KOH. Spinning side bands are indicated by *.
Figure 2B:
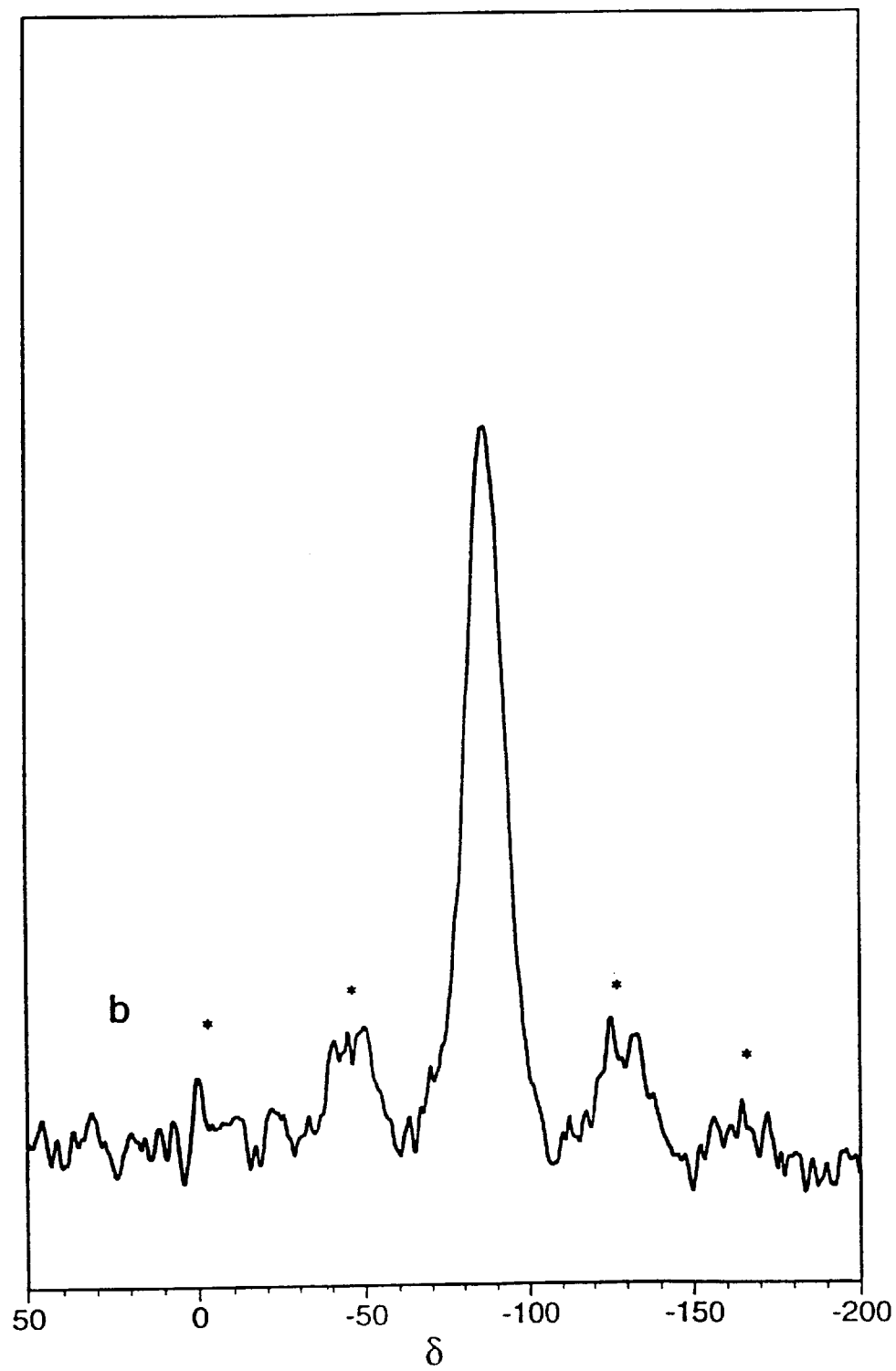

The $^{29}Si$ MAS NMR spectrum of the kaolin amorphous derivative of the above chemical composition may consist of a broad (FWHM~13 ppm) signal centered on −86 ppm (see FIG. 2b). This compares with the very narrow signal observed for kaolinite centred on −91.5 ppm (FWHM~1.4 ppm). Apart from the broadening of this peak, which would be expected as a result of the breakdown of the layered structure, the average chemical environment is approximately the same as in the kaolinite starting material.

The kaolin amorphous derivative generally is XRD-amorphous, that is, it does not show any substantial long-range structural ordering. The XRD profile for the kaolin amorphous derivative of a broad hump between 14° and 40° 2θ for CuKα radiation. No sharp diffraction peaks are observed except for those belonging to impurity phases such as anatase or quartz, which may come from the kaolin starting material. If the kaolin amorphous derivative is not thoroughly rinsed with water and then an alkali hydroxide solution, minor levels of reaction byproducts are difficult to avoid completely. If the alkali halide is RbX or CsX, a broad diffraction peak occurs at the center of the broad hump attributable to the kaolin amorphous derivative in an XRD pattern.

Figure 3A:
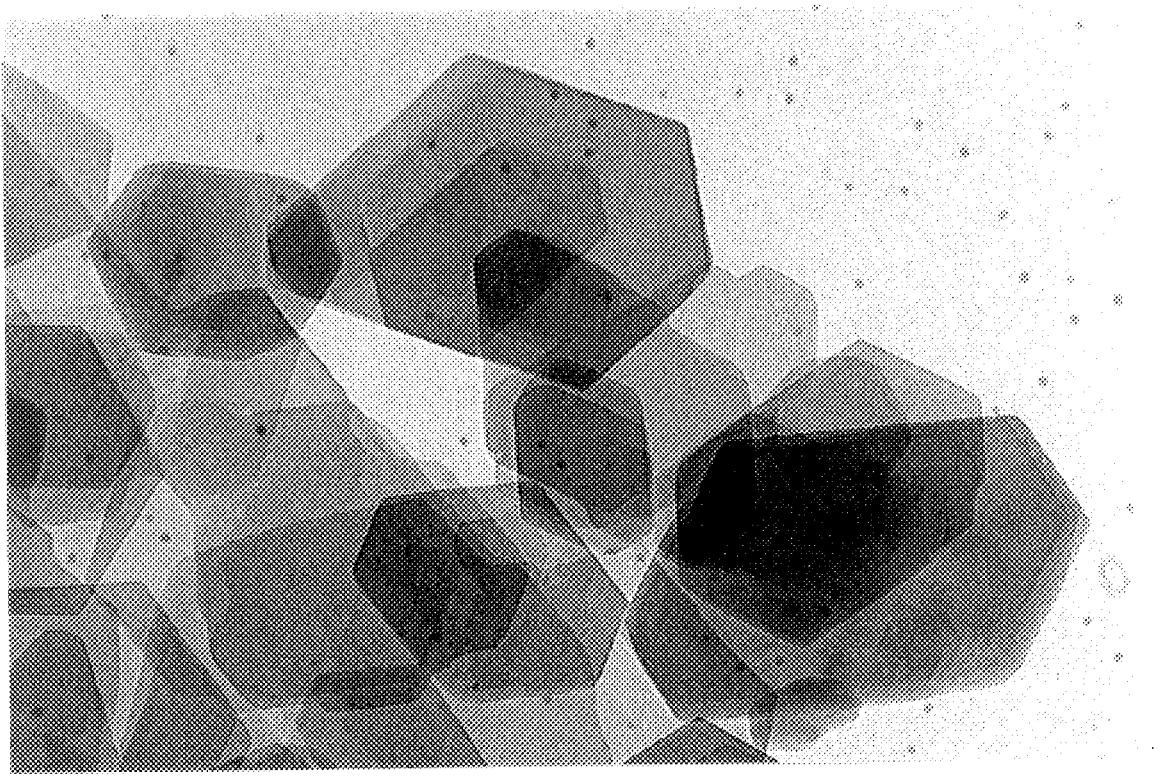
FIG. 3A: Shows transmission electron micrograph of Weipa kaolinite grains before reaction
Figure 3B:
FIG. 3B shows KAD grains after reaction according to Example 1. Both images are at 250,000×magnification.
Figure 4A:
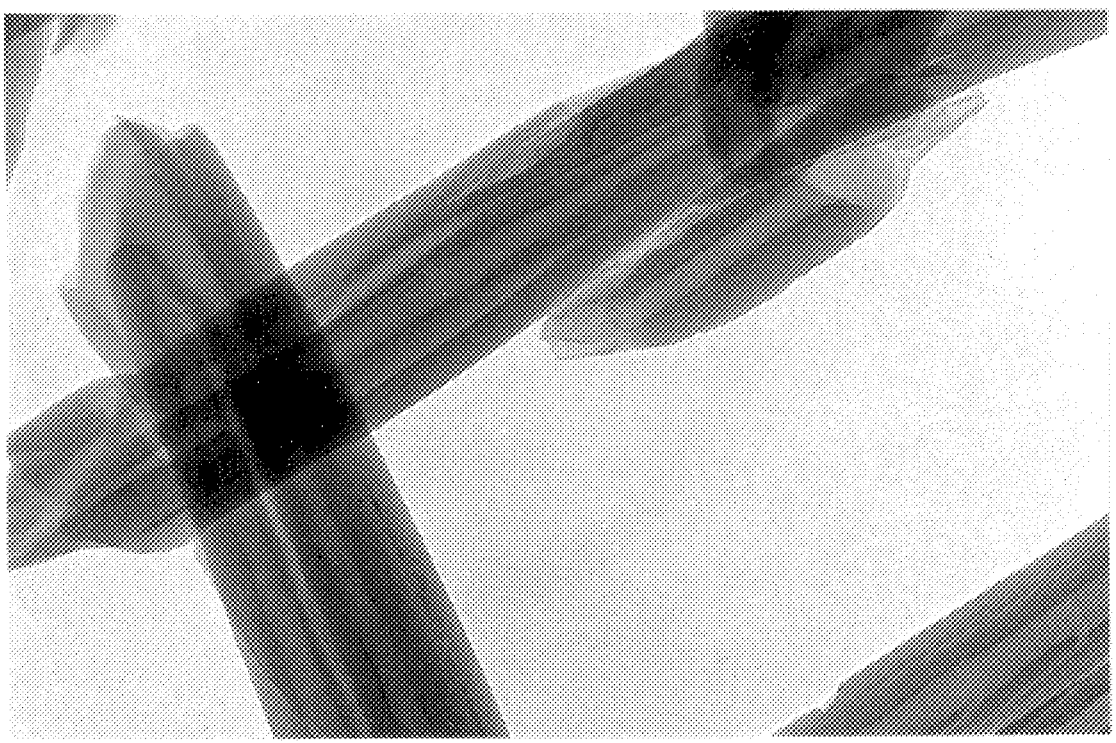
FIG. 4A: Shows transmission electron micrograph of Matuara Bay tubular halloysite grains before reaction

High magnification scanning electron microscopy, and transmission electron microscopy both show that the kaolin amorphous derivative may consist of aggregates of very small anhedral particles of approximate dimensions <50 nm. FIGS. 3a and 3b show TEM micrographs of the typical kaolinite grains before reaction and reacted kaolin amorphous derivative product, respectively. Note the significant change in morphology from large, micrometer-sized hexagonal plates of kaolinite (FIG. 3a) to anhedral nanometer-sized (~40 nm) particles which have aggregated into large clumps (~1 μm in size). FIGS. 4a and 4b show TEM micrographs for typical tubular halloysite grains and the reacted kaolin amorphous derivative product from this starting material, respectively.

As disclosed above, one form of the kaolin amorphous derivative has the chemical composition:

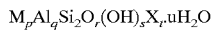

$M_p Al_q Si_2 O_r (OH)_s X_t \cdot u H_2 O$ where M is an exchangeable alkali metal cation, X is a halide, $0.5 \leq p \leq 2.0$, $1.0 \leq q \leq 2.2$, $4.5 \leq r \leq 8.0$, $1.0 \leq s \leq 3.0$, $0.0 \leq t \leq 1.0$ and $0.0 \leq u \leq 3.0$. In one specific form, the kaolin amorphous derivative may contain the element potassium, such that M=K. Hereinafter the term "KAD" is used to refer to a kaolin amorphous derivative having the above chemical composition.

In the KAD referred to above it is possible to exchange, at least partly, the alkali metal cation with any cation which is stable in aqueous solution. Such exchange cations include other alkali metal cations, alkaline earth cations, transition metal cations, lanthanide and actinide cations, heavy metal cations and ammonium. While exchange does not proceed to completion for all cations, there are many transition metal cations (e.g. $Mn^{2+}$, $Cr^{3+}$, $Co^{2+}$, $Ni^{2+}$, $Cu^{2+}$, $Zn^{2+}$, $Ag^+$), lanthanide cations (e.g. $La^{3+}$, $Nd^{3+}$) and heavy metal cations (e.g. $Pb^{2+}$, $Cd^{2+}$, $Hg^{2+}$) which do. For some cations exchange is complete after 3 hours at room temperature (e.g. $Pb^{2+}$, $Cu^{2+}$), while others require longer times and temperatures up to 110° C. (e.g. $Zn^{2+}$). Such cation exchange essentially preserves the XRD-amorphous character of the unexchanged kaolin amorphous derivative. However, the specific surface of the exchanged materials, while still manyfold that of kaolin, does increase or decrease depending on the exchange cation. Examples of this are given in Table 1.

TABLE 1

Comparison of Surface Areas for some Metal-Exchanged KADs

| Sample | BET surface area $m^2 g^{-1}$ |
|---|---|
| Ni-KAD | 49 |
| Ag-KAD | 129 |
| K-KAD | 150 |
| Co-KAD | 200 |
| Cu-KAD | 230 |
| Zn-KAD | 283 |

Figure 5:
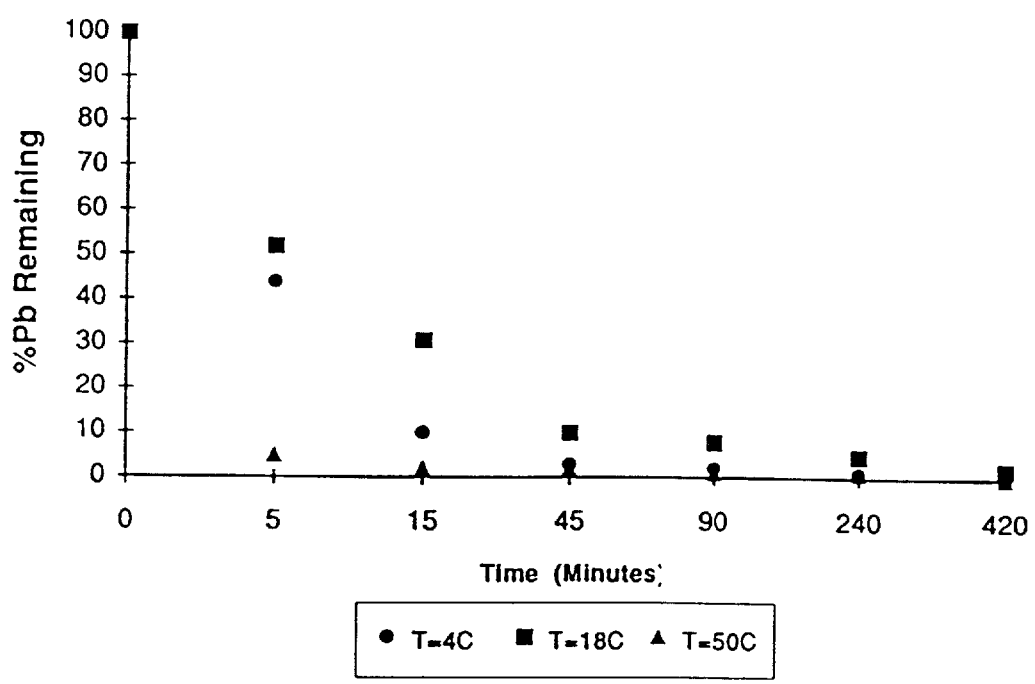
FIG. 5: Plot showing the rate of exchange of $Pb^{2+}$ with KAD following the method given in Example 4 for three different solution temperatures. The plot shows the percentage of $Pb^{2+}$ remaining in solution over time.

The rate at which this cation exchange occurs can be changed by the application of chemical techniques used by those skilled in the art. For example, as shown in FIG. 5, the rate of exchange of $Pb^{2+}$ with $K^+$ is increased at a temperature of 50° C. compared to exchange at room temperature. In addition, this exchange reaction can be reversed on suitable treatment of the exchanged KAD (e.g. Cu-KAD). An example of such treatment on a Cu-exchanged KAD is the use of ammonia solution to generate a soluble ammine complex. In this exchange, $NH_4+$ replaces the $Cu^{2+}$ cations. This property has particular use in the recovery of transition metals or other cations which have been removed from solution or from a slurry by KAD.

The substantially increased specific surface makes the KAD a useful replacement for conventional catalysts such as those used in the rearrangement and conversion of hydrocarbons, as well as for novel applications in this regard.

Another application is the loading of lanthanides and/or transition metals on the KAD in reduction-oxidation catalysed reactions. An example of this is the dehydrogenation of methanol to give methyl formate.

Many other applications will be apparent to the skilled addressee.

Specific examples of the synthesis of KAD from naturally occurring kaolins as well as cation exchange and catalysis reactions follow.

EXAMPLE 1

Preparation of KAD from Kaolinite 1.0 g of kaolinite obtained from Weipa, Queensland Australia, and 4.5 g of potassium fluoride are thoroughly mixed with 2.0 ml of water. The mixture is heated in an oven at 100° C. for 2.5 hours. The reaction products are then dispersed in 100 ml of distilled water and centrifuged until the solid fraction has completely settled. The elute containing the excess salt and a small amount of the weakly soluble fluoride byproduct is decanted. This rinsing process is repeated until no further fluoride can be detected in the elute by the addition of silver nitrate solution, typically 3 to 4 rinses. The remaining solid is dried at 110° C. in air and comprises a mixture of KAD and relatively insoluble fluoride byproducts as shown by XRD (see FIG. 6b). The combined weight of the mixture is 1.19 g.

Figure 6A:
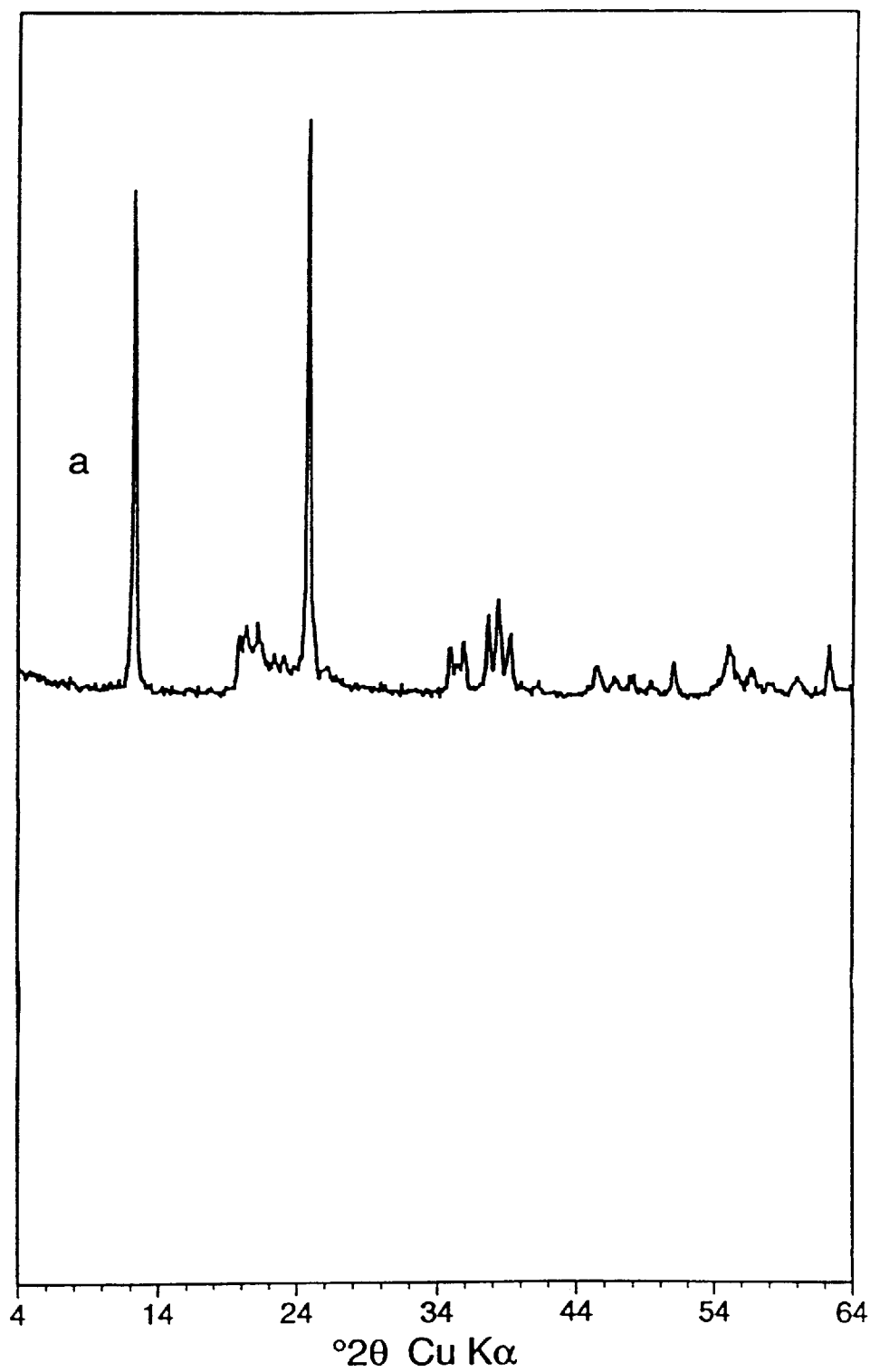
FIGS. 6A, 6B and 6C: X-ray powder diffraction patterns of FIG. 6A Weipa kaolinite, FIG. 6B KAD which has been prepared from Weipa kaolinite according to Example 1, after rinsing with water and FIG. 6C KAD after rinsing with KOH. Diffraction peaks due to anatase, which is an impurity in the starting material, are indicated by +, and the poorly soluble flouride byproducts are indicated by *.
Figure 6B:
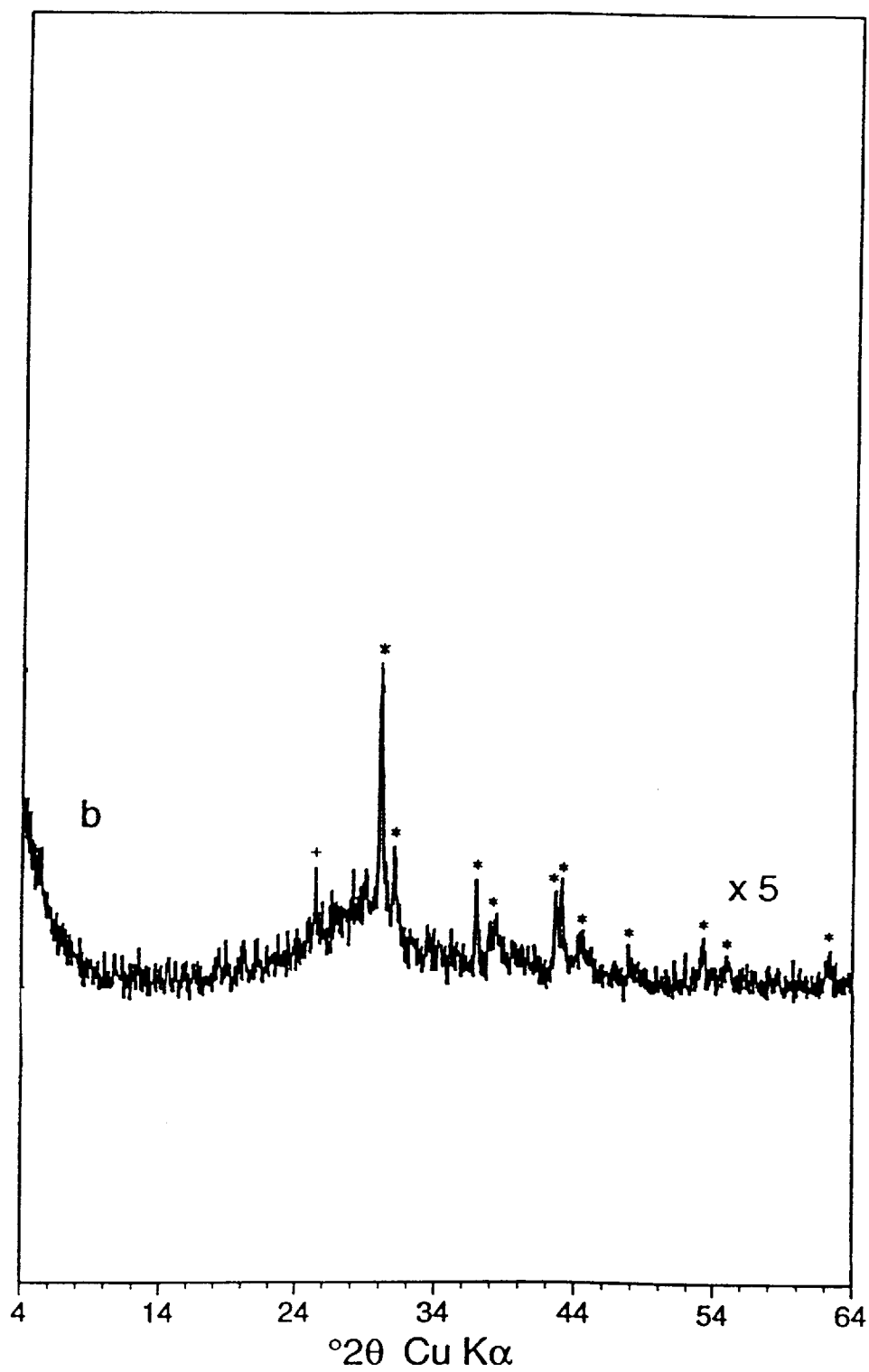
Figure 6C:
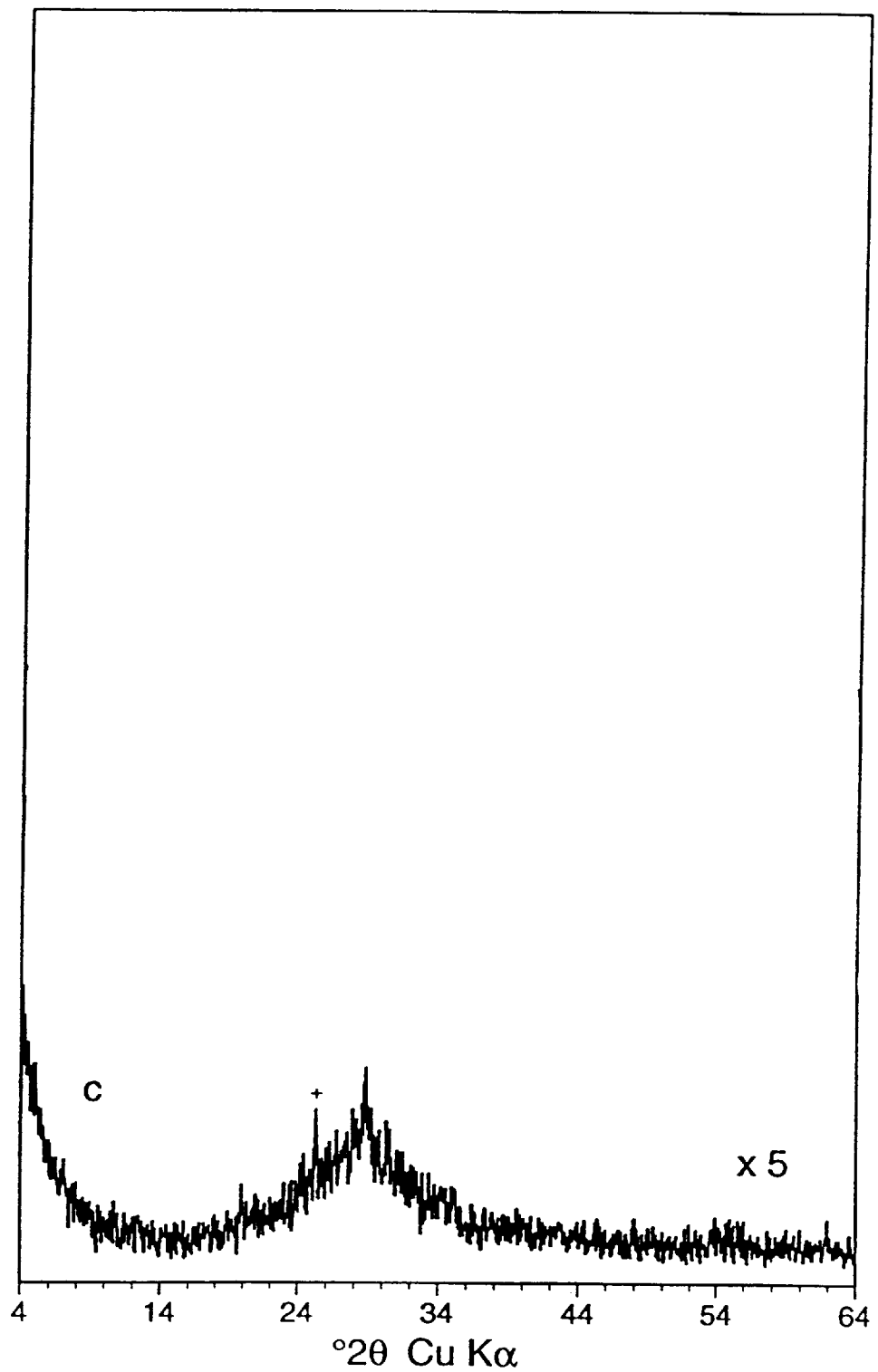

The fluoride byproducts are removed by dispersing the solid mixture in 40 ml of 0.02M potassium hydroxide solution (pH=13) for 30 minutes at room temperature. The suspension is then centrifuged until the solid fraction has completely settled. The alkaline elute containing the dissolved fluoride byproducts is decanted. The remaining solid is now rinsed with cold water until the pH of the elute drops to 8. The solid is dried at 110° C. to give a final yield of 0.95 g and comprises KAD together with the minor impurity mineral anatase, as evidenced by XRD (see FIG. 6c). FIG. 6a shows an XRD trace for kaolinite before reaction to KAD.

The BET surface area measurement for this KAD, after pretreatment at 110° C. for four hours, is $100(1)$ $m^2 g^{-1}$.

Bulk compositional analyses have been obtained from a suitably prepared pressed disk of the KAD powder prepared from kaolinite, as well as of the same KAD powder after heating to 650° C., using an electron microprobe and are summarized in Table 2. In this table, the values in parentheses are estimated standard deviations to the last significant figure for the weight percentage oxides calculated according to conventional statistical methods.

TABLE 2*

Composition of KAD prepared from Weipa kaolinite

| Oxide (Weight percent) | KAD | KAD (after heating to 650° C.) |
|---|---|---|
| Microprobe Analysis | | |
| $K_2O$ | 19.27 (60) | 19.22 (24) |
| $Al_2O_3$ | 25.25 (51) | 26.26 (41) |
| $SiO_2$ | 44.80 (80) | 46.89 (75) |
| $Fe_2O_3$ | 1.49 (11) | 1.63 (22) |
| $TiO_2$ | 1.40 (3) | 1.26 (59) |
| Total | 92.19 (56) | 95.26 (57) |
| Weight loss of as-prepared KAD on heating | | |
| 110° C. (for 20 hrs) | | 11.5 |
| 650° C. (for 64 hrs) | | 6.0 |
| Total Loss | | 17.5 |
| Fluorine/Content (using ion selective electrode) | 0.43 | 0.37 |

*All values are weight percentages

TABLE 3*

Composition of KAD prepared from Mataura Bay tubular halloysite

| Oxide (Weight percent) | KAD | KAD (after heating to 650° C.) |
|---|---|---|
| Microprobe Analysis | | |
| $K_2O$ | 19.20 (103) | 18.80 (91) |
| $Al_2O_3$ | 23.37 (152) | 24.88 (86) |
| $SiO_2$ | 48.82 (401) | 52.50 (198) |
| $Fe_2O_3$ | 0.27 (6) | 0.28 (3) |
| $TiO_2$ | 0.06 (3) | 0.06 (2) |
| Total | 91.72 (238) | 96.48 (65) |
| Weight loss of as-prepared KAD on heating | | |
| 110° C. (for 20 hrs) | | 11.0 |
| 650° C. (for 64 hrs) | | 5.8 |
| Total Loss | | 16.8 |
| Fluorine/Content (using ion selective electrode) | 0.44 | 0.41 |

*all values are weight percentages.

EXAMPLE 2

Preparation of KAD from Halloysite 10.0 g of halloysite obtained from Mataura Bay, Northland, New Zealand, and 42.0 g of potassium fluoride are thoroughly mixed with 20.0 ml of water. The mixture is heated in an oven at 95° C. for 1.0 hour. The reaction products are then dispersed in 1 liter of distilled water and the solids allowed to settle for 2 hours. The elute containing the excess salt and a small amount of the weakly soluble fluoride byproducts is decanted. This rinsing process is repeated until no further fluoride can be detected in the elute by the addition of silver nitrate solution, typically 5 rinses. After the final rinsing the slurry is centrifuged until the solid fraction has completely settled. The remaining solid is dried at 110° C. in air and comprises a mixture of KAD and relatively insoluble fluoride byproducts with a combined weight of 13.9 g as shown by XRD (see FIG. 7b).

Figure 7A:
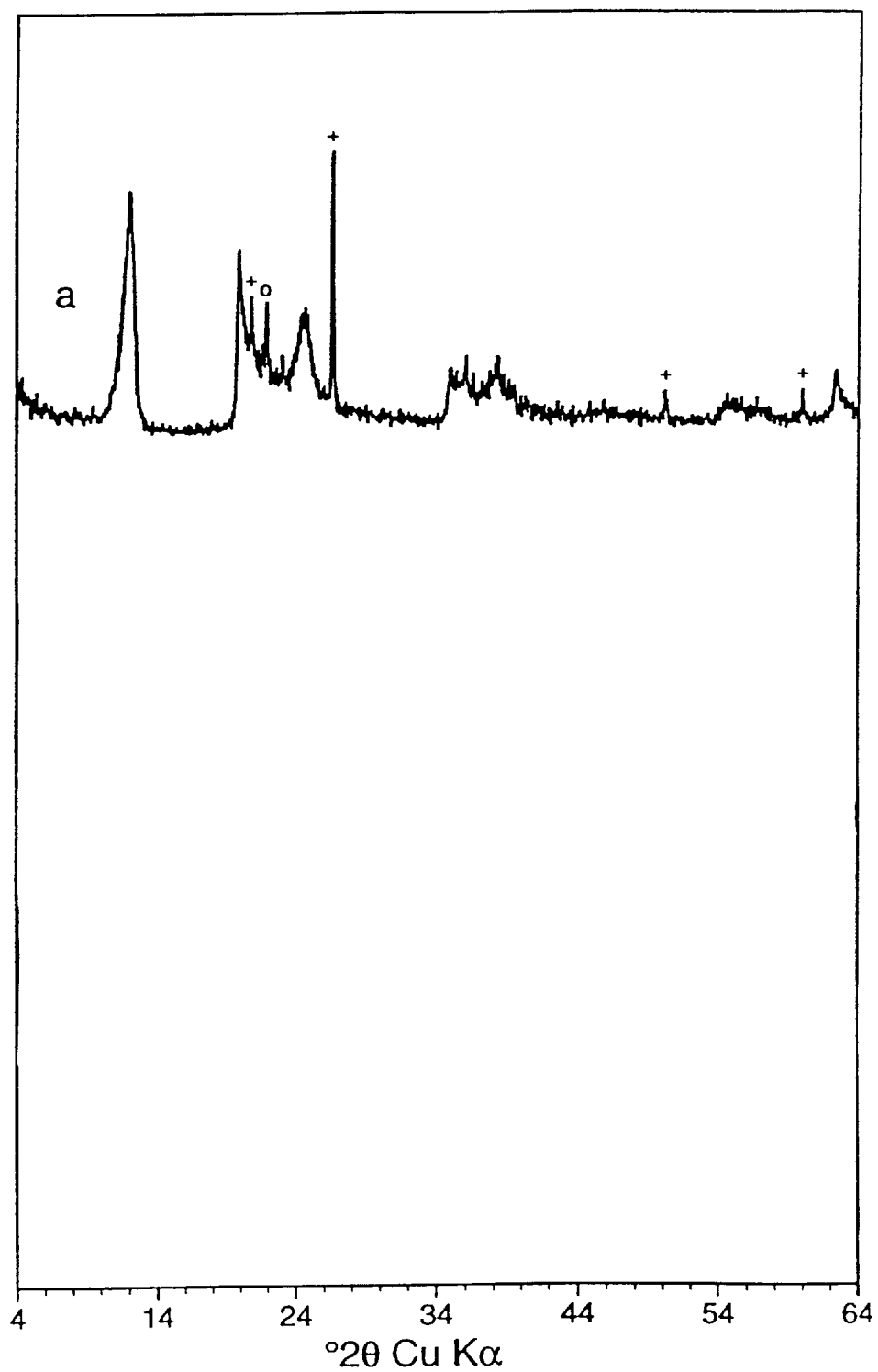
FIG. 7A, 7B and 7C: X-ray powder diffraction patterns of FIG. 7A Mataura Bay halloysite, FIG. 7B KAD which has been prepared from Mataura Bay halloysite according to Example 2, after rinsing with water and FIG. 7C KAD after rinsing with KOH. Diffraction peaks due to anatase, which is an impurity in the starting material, are indicated by +, and the poorly soluble flouride byproducts are indicated by *.
Figure 7B:
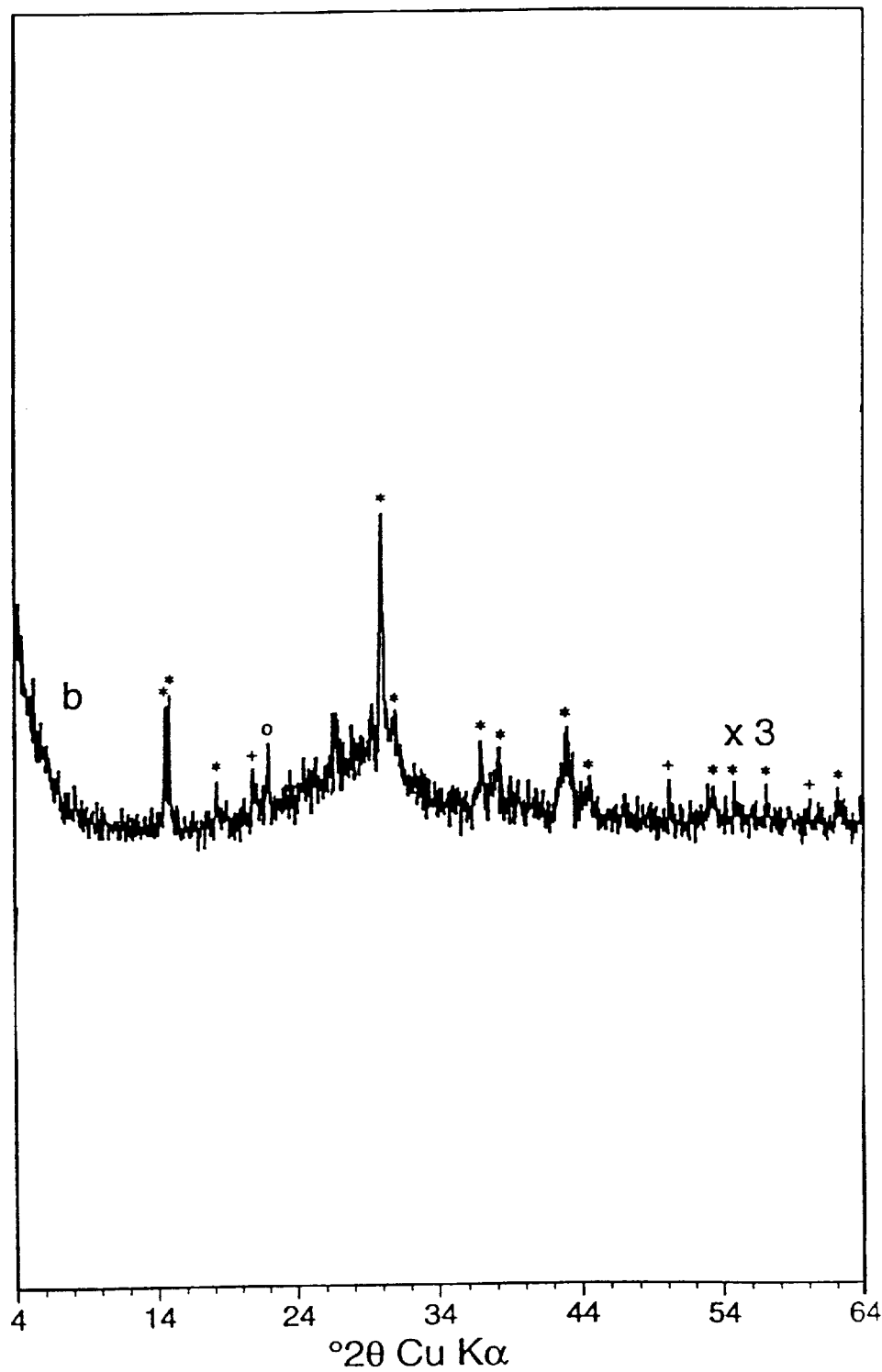
Figure 7C:
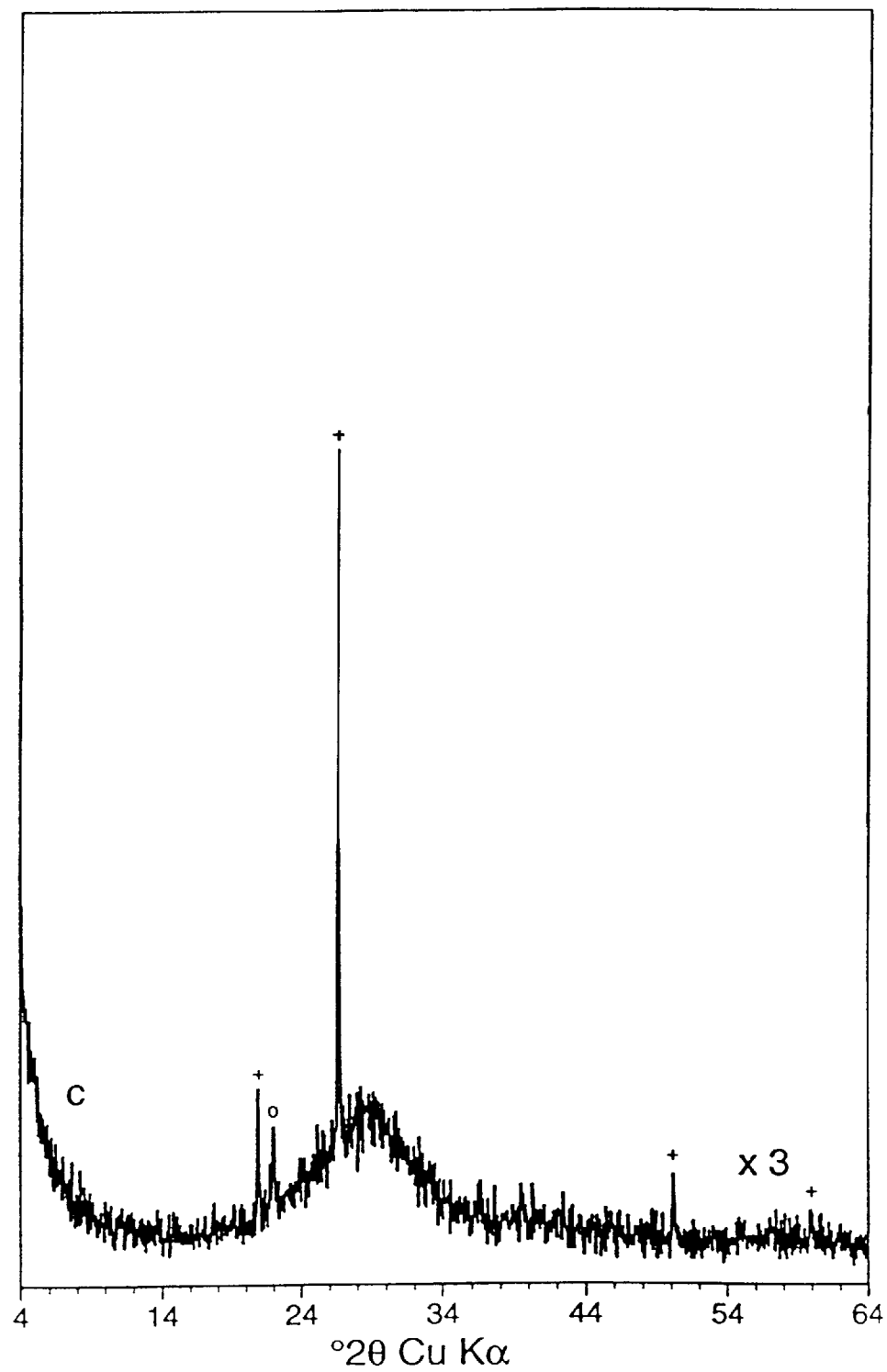

The fluoride byproducts are removed by dispersing the solid mixture in 400 ml of 0.02M potassium hydroxide solution (pH=13) for 30 minutes at room temperature. The suspension is then centrifuged until the solid fraction has completely settled. The alkaline elute containing the dissolved fluoride byproducts is decanted. The remaining solid is now rinsed with cold water until the pH of the elute drops to 8. The solid is dried at 110° C. to give a final yield of 9.7 g and comprises KAD together with the minor impurity minerals quartz and cristobalite, as evidenced by XRD (see FIG. 7c). FIG. 7a shows an XRD trace of the halloysite before reaction to the amorphous derivative.

The BET surface area measurement for this KAD, after pre-treatment at 110° C. for four hours, is 167(1) $m^2g^{-1}$.

Bulk compositional analyses have been obtained from a suitably prepared pressed disk of the KAD powder prepared from the halloysite, as well as of the same KAD powder after heating to 650° C., using an electron microprobe and are summarised in Table 3. In this table, the values in parentheses are estimated standard deviations to the last significant figure for the weight percentage oxides calculated according to conventional statistical methods.

In aqueous suspension, KAD wherein the metal cation is alkali metal or ammonium cation has a particular affinity to certain other cations. The cations include the alkaline earths $Mg^{2+}$, $Ca^{2+}$ and $Sr^{2+}$, the transition metals $Cr^{3+}$, $Mn^{2+}$, $Co^{2+}$, $Fe^{2+}$, $Ni^{2+}$, $Cu^{2+}$, $Zn^{2+}$, $Ag^+$, $Cd^{2+}$, and $Hg^{2+}$, as well as $Pb^{2+}$, the lanthanide $Nd^{3+}$, and the actinide $UO_2^+$. Due to the similar chemical behaviour of trivalent lanthanides it is assumed that the properties demonstrated for $Nd^{3+}$ apply to all trivalent lanthanides, including $Y^{3+}$.

The affinity of KAD for these cations has been demonstrated by measuring the percent uptake of each of these cations from a solution containing a low concentration (10–100 ppm) of the subject cation and a relatively high concentration of $Na^+$ (0.1M). The details of these experiments together with their results are given in Example 10

The level of selectivity of KAD towards these cations is relatively independent of temperature but the rate of exchange is significantly enhanced by increase in temperature. This increase in exchange rate is shown by the example below.

EXAMPLE 3

Kinetics of $Cu^{2+}$ Exchange 0.25 g of KAD was dispersed in 100 ml of 0.1M $NaNO_3$ solution containing 100 ppm $Cu^{2+}$. The KAD was stirred throughout the experiment and aliquots of the solution were removed as a function of time. The aliquot was immediately centrifuged to remove suspended KAD and the solution analysed for remaining $Cu^{2+}$. The % $Cu^{2+}$ removal as a function of time at room-temperature (20° C.) and at 50° C. is given in Table 4 below.

TABLE 4

Percentage $Cu^{2+}$ Removed from Standard Solution

| Time (Minutes) | Room Temp 20° C. | Higher Temp 50° C. |
|---|---|---|
| 1 | — | 39.5 |
| 2 | — | 53.9 |
| 5 | 36.7 | 72.0 |
| 10 | 65.7 | — |
| 15 | 76.4 | 95.9 |
| 30 | 88.6 | 98.3 |
| 60 | 92.6 | — |
| 90 | — | 98.7 |
| 120 | 96.6 | — |
| 240 | 98.1 | 99.1 |
| 1440 | 98.8 | — |

EXAMPLE 4

Kinetics of $Pb^{2+}$ Exchange 0.25 g of KAD is thoroughly dispersed in 100 ml of a 0.1M solution of $NaNO_3$ which contains 100 ppm of $Pb^{2+}$. The suspension is stirred for 3 hours at room-temperature then centrifuged. Atomic absorption spectroscopic (AAS) analysis of the elute showed that the KAD-treated solution contained only 1 ppm of $Pb^{2+}$ that is, there had been a 99% reduction in the $Pb^{2+}$ concentration of the $Na^+$-rich solution. A plot of this exchange reaction, for data obtained at three different solution temperatures is given in FIG. 5.

The level of selectivity of KAD towards these various cations is essentially retained across a wide range of pH conditions. Of particular importance is the stability and the preservation of selectivity of KAD at low pH as it is under these acid conditions that most of the cations mentioned above are most soluble. This property is particularly relevant for the application of KAD in sequestering and retrieving these cations from industrial and mine waste waters. While KAD is also stable under alkaline conditions (up to pH 13) the solubility of most of the abovementioned cations is negligible and, thus, the selectivity of KAD could not be tested.

EXAMPLE 5 pH dependence of $Pb^{2+}$ Exchange 0.25 g of KAD wherein M is potassium was dispersed both in 100 ml of 0.1M $NaNO_3$ solution and in 0.1M $Ca(NO_3)_2$ solution, each containing 100 ppm $Pb^{2+}$. The pH of the solutions was adjusted using dilute $HNO_3$ or dilute NaOH solutions as appropriate. The solutions were stirred at room-temperature (20° C.) for 24 hours, the KAD then removed by centrifuge and the solutions analysed for remaining $Pb^{2+}$. This analysis then gives the amount of $Pb^{2+}$ removed from solution at the particular pH. Details of these experiments are given in Table 5 below.

TABLE 5

Percentage of $Pb^{2-}$ Removed from solution at Various pH

| pH | 0.1M $Ca(NO_3)_2$ with 100 ppm $Pb^{2+}$ | 0.1M $NaNO_3$ with 100 ppm $Pb^{2+}$ |
|---|---|---|
| 2.5 | 86.1 | 97.2 |
| 4.0 | 98.6 | 98.3 |
| 6.0 | 97.6 | 97.9 |
| 8.0 | 83.3 | 96.9 |

EXAMPLE 6

Use of KAD as a water softener or detergent builder in providing sequestering of $Ca^{2+}$ and $Mg^{2+}$ in preference to $Na^+$ in aqueous solutions.

Eighty milligrams of KAD powder is dispersed and stirred in 25 ml of four different solutions for a period of two hours, after which KAD is removed from the supernatant. The supernatant is analysed for the concentrations of $Mg^{2+}$ and $Ca^{2+}$. The four different aqueous solutions contain: (i) 10 ppm $Ca^{2+}$ and $Mg^{2+}$ in distilled water at 18° C. (the control sample), (ii) 10 ppm of $Ca^{2+}$ and $Mg^{2+}$ in a 0.1M NaCl solution at 18° C., (iii) 10 ppm of $Ca^{2+}$ and $Mg^{2+}$ in a 0.1M NaCl solution at 50° C. and (iv) 100 ppm of $Ca^{2+}$ and $Mg^{2+}$ in a 0.1M NaCl solution at 18° C. Data from these experiments are summarised in Table 6.

TABLE 6

Comparison of $Ca^{2+}$ and $Mg^{2+}$ Selectivity

| | 10 ppm Ca + Mg Distil $H_2O$ 18° C. | 10 ppm Ca + Mg 0.1M NaCl 18° C. | 10 ppm Ca + Mg 0.1M NaCl 50° C. | 100 ppm Ca + Mg 0.1M NaCl 18° C. |
|---|---|---|---|---|
| % $Mg^{2+}$ Remaining | 17 | 11 | 5 | 90 |
| % Ca + 2 Remaining | 0 | 36 | 23 | 79 |

As indicated in Table 6, KAD shows a capability to sequester $Ca^{2+}$ and $Mg^{2+}$ from solution which is suitable for application as a detergent builder or water softener.

In some applications for which KAD is to be used as a sequestering agent for the selective removal of cations from aqueous solution, it may be necessary to utilise KAD in a form which is not as a dispersed powder. KAD in its as-prepared form has a very fine particle or aggregrate size and disperses readily. In some applications, this property may hinder exploitation of the exchange properties because the physical separation of the exchanged KAD from the treated aqueous solution may be difficult or expensive.

For applications which require a mechanically stable monolithic body of various shapes, KAD can be combined with an organic polymer or with colloidal silica to allow KAD to bind to itself thereby increasing significantly the overall aggregate size and reducing the problem of physical separation of exchanged KAD from treated solution. The bound material can then be formed into robust pellets or other aggregates, or can be bound to a substrate such as wood fiber to form cation selective filter paper. Examples of the process for the formation of pellets using either an organic polymer or colloidal silica are given below:

EXAMPLE 7

Process for binding KAD using polycarbonate resin 0.012 g of polycarbonate resin is dissolved in 20 ml of toluene. 2.5 ml of this solution is added to 0.2 g of KAD, equivalent to an addition of 0.075 wt % polymer. The resultant slurry is thoroughly homogenised using a mortar and pestle then dried at 40° C. for 30 minutes. Pellets are formed from this material using a pellet press and applying uniaxial pressure of about 500 kgcm$^{-2}$.

EXAMPLE 8

Process for binding KAD using colloidal silica 0.0304 g of Ludox AM (du Pont) is dissolved in 0.6 ml of water. 0.3 ml of this mixture is added to 0.25 g of KAD, equivalent to an addition of ~2 wt % colloidal silica. An additional 0.9 ml of water is then added and the slurry homogenised using a mortar and pestle then dried at 85° C. for 18 minutes. Pellets are formed from this material using a pellet press and applying uniaxial pressure of about 500 kgcm$^{-2}$. The pellets are finally heated at 85° C. for 1.25 hours.

KAD which has been bound using either organic polymer or colloidal silica into monolithic pellets or discs retains its cation exchange properties to the abovementioned cations. This property of KAD is shown by the example given below.

EXAMPLE 9

Selectivity of KAD towards $Cu^{2+}$ when bound into pellets

The following experiments were performed for KAD pellets prepared using both polycarbonate resin and colloidal silica as binding agents.

2×0.015 g KAD pellets are placed in 5 ml of 0.1M NaNO$_3$ solution containing 100 ppm $Cu^{2+}$. The solutions were stirred at room-temperature (20° C.). After 24 hours one pellet was removed and 2.5 ml of the solution removed for analysis for remaining $Cu^{2+}$. The remaining solution was stirred at room-temperature for a further 2 days after which the second pellet was removed and the remaining solution again analysed. These data allow determination of the amount of $Cu^{2+}$ removed from solution using these bound pellets of KAD and are given in Table 7.

TABLE 7

Percentage of $Cu^{2+}$ Removed from Solution using KAD Pellets with various binders

| Time (days) | Colloidal Silica | Polycarbonate Resin |
| --- | --- | --- |
| 1 | 70 | 37 |
| 3 | 94 | 94 |

EXAMPLE 10

Comparison of KAD selectivity for various cations.

A suite of exchange experiments were conducted using samples of KAD prepared as in Example 1 (from kaolinite) and in Example 2 (from halloysite). In each case, the exchange experiments with other cations were conducted in a 0.1M NaNO$_3$ solution for 16 hours at room temperature. Typically, 90 mg of KAD was dispersed in 30 ml of solution. Results for these exchange experiments, in which the percentage removal of cation from solution was measured, are given in Table 8. Unless otherwise stated in this Table, the pH of the exchange solution was close to neutral. The concentrations of cations before and after exchange were determined using Atomic Absorption Spectroscopy, except in the case of $Nd^{3+}$ and $UO_2^{2+}$ for which UV/visible spectroscopy was used.

TABLE 8

Selectivity of KADs described in Examples 1 and 2 towards various cations

| | Starting | Percentage Removal of Cation | |
| --- | --- | --- | --- |
| Cation | Conc'n (ppm) | KAD (Example 1) | KAD (Example 2) |
| $Ni^{2+}$ | 10 | 99 | 97 |
| $Co^{2+}$ | 10 | 99 | 95 |
| $Ag^+$ | 10 | 98 | 94 |
| $Zn^{2+}$ | 10 | 99 | 99 |
| $Hg^{2+}$ pH 2.5 | 100 | 77 | 76 |
| $Cd^{2+}$ pH 1.5 | 10 | 5 | 6 |
| $Cd^{2+}$ pH 5.5 | 10 | 98 | 98 |
| $Pb^{2+}$ pH 1.0 | 20 | 32 | 35 |
| $Pb^{2+}$ pH 3.5 | 20 | 100 | 100 |
| Fe | 10 | 100 | 100 |
| $Cr^{3+}$ | 20 | 100 | 100 |
| $Mn^{2+}$ | 10 | 99 | 99 |
| $Al^{3+}$ | 100 | 99 | 97 |
| $Sr^{2+}$ | 40 | 100 | 100 |
| $Ca^{2+}$ | 20 | 99 | 100 |
| $Mg^{2+}$ | 10 | 90 | 90 |
| $Cu^{2+}$ | 100 | 100 | 100 |
| $Nd^{3+}$ | 100 | >80 | |
| $UO_2^{3+}$ | 6000 | >80 | |

EXAMPLE 11

Synthesis of KAD at elevated pressure and higher temperature.

Figure 8:
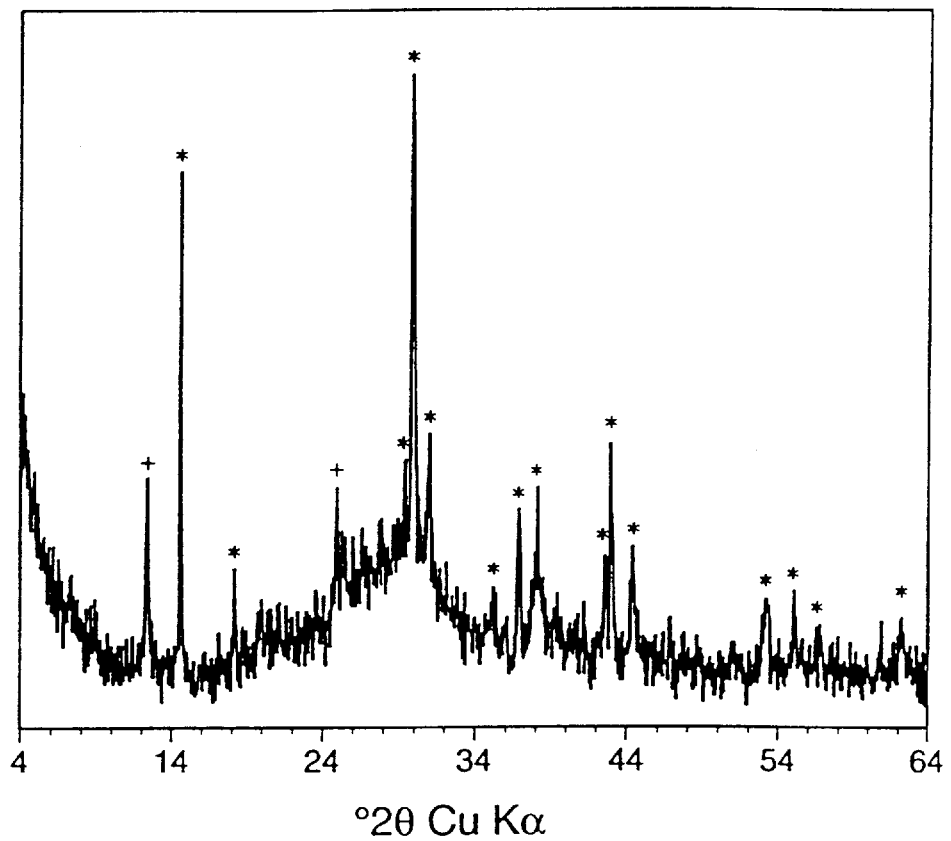
FIG. 8: X-ray powder diffraction pattern (CuKa) of KAD which has been prepared from Weipa kaolinite at elevated pressure and 150° C. using KF as the reagent according to Example 11, after rinsing with water but before rinsing with KOH. Diffraction peaks due to unreacted kaolinite are indicated by + and the poorly soluble flouride byproducts are indicated by *.

1.0 g of kaolinite obtained from Weipa, Queensland, Australia, and 4.0 g of potassium fluoride were thoroughly mixed with 3 ml of water. The mixture was transferred into a teflon sealed pressure vessel and placed in an oven at 150° C. The vessel reached 80° C. within 5 minutes and 150° C. after a further 20 minutes. The vessel was held at this temperature for 5 minutes then removed from the oven and cooled to below 80° C. The reaction products were then dispersed in 100 ml of distilled water and centrifuged until the solid fraction has completely settled. The elute containing the excess salt and a small amount of the weakly soluble fluoride byproducts was decanted. This rinsing process was repeated until no further fluorine could be detected in the elute by addition of silver nitrate solution; typically after 3 to 4 rinses. The remaining solid was dried at 110° C. in air and comprises a mixture of KAD, starting kaolinite and relatively insoluble fluoride byproducts with a combined weight of 1.25 g. FIG. 8 shows the XRD pattern of the solid reaction products.

EXAMPLE 12

Synthesis of KAD using NaF as the reagent.

Figure 9:
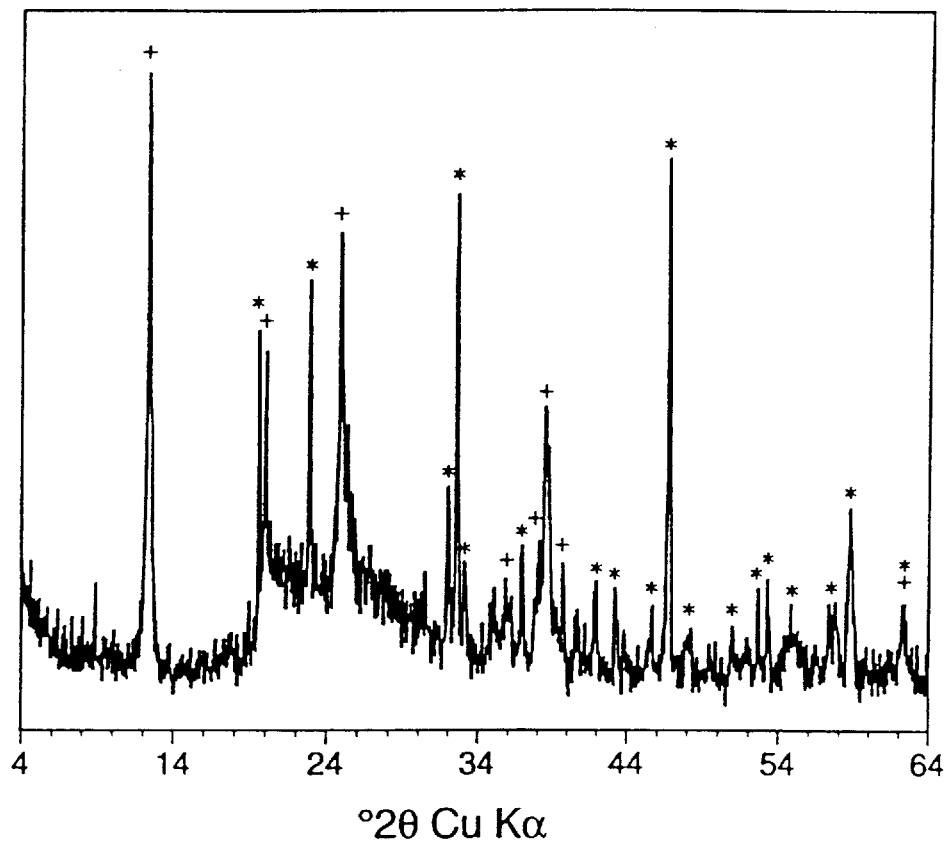
FIG. 9: X-ray powder diffraction pattern (CuKa) of KAD which has been prepared from Weipa kaolinite using NaF as the reagent according to Example 12, after rinsing with water but before rinsing with KOH. Diffraction peaks due to unreacted kaolinite are indicated by + and the poorly soluble flouride byproducts are indicated by *.

0.25 g of kaolinite obtained from Weipa, Queensland, Australia, and 1.25 g of sodium fluoride were thoroughly mixed with 5 ml of water. The mixture was transferred into a teflon sealed pressure vessel and placed in an oven at 200° C. for 20 hours. The reaction products were then dispersed in 100 ml of warm (36°–40° C.) distilled water and centrifuged until the solid fraction had completely settled. The elute containing the excess salt and a small amount of the weakly soluble fluoride byproducts was decanted. This rinsing process was repeated, 6 to 8 times, until no further fluorine could be detected in the elute. The remaining solid was dried at 110° C. in air and comprised a mixture of Na—KAD, starting kaolinite, and insoluble fluoride byproducts with combined weight of 0.39 g. FIG. 9 shows the XRD pattern of the solid reaction products.

EXAMPLE 13

Synthesis of KAD using either RbF or CsF as the reagent.

Figure 10A:
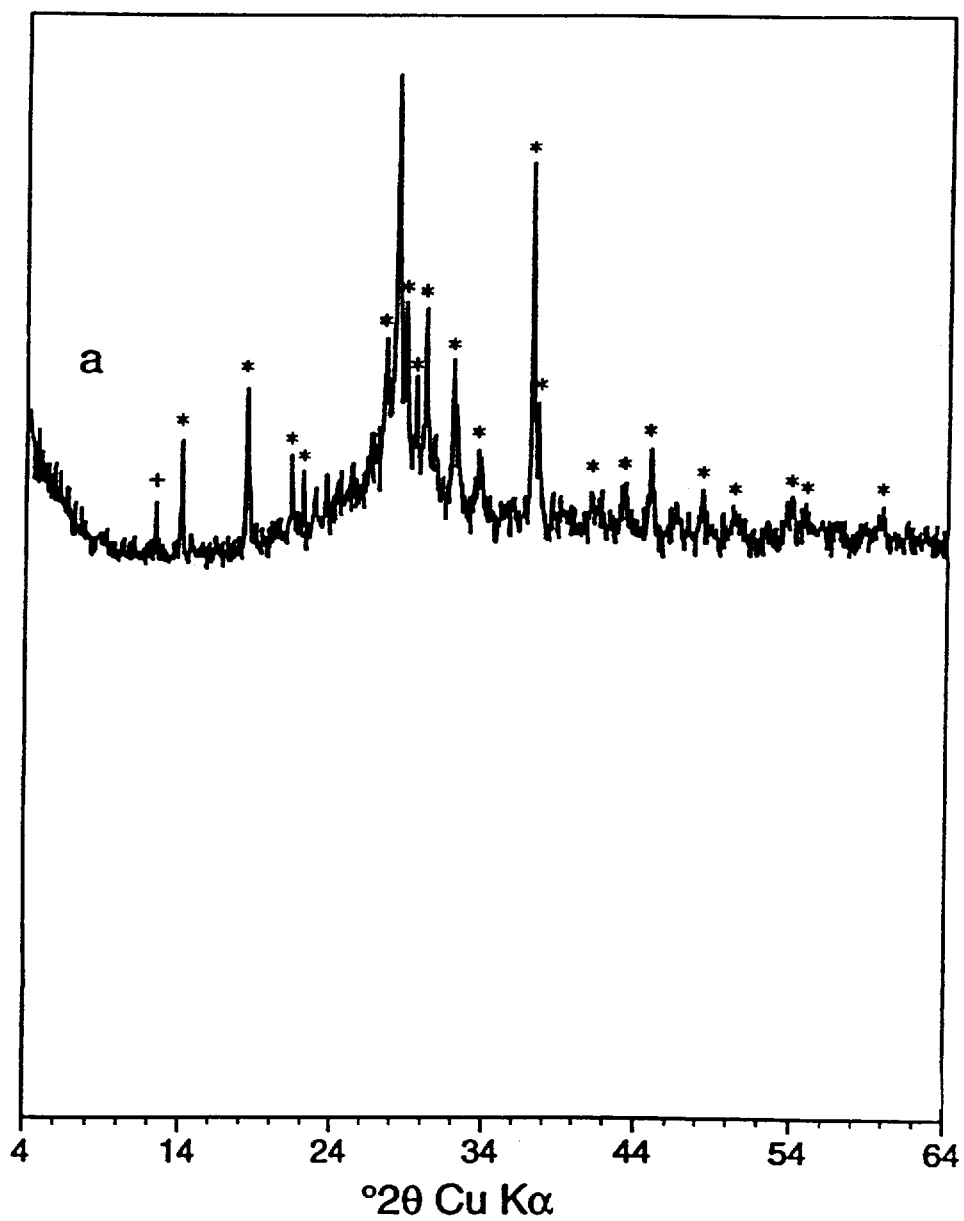
FIGS. 10A and 10B: X-ray powder diffraction patterns (CuKa) of KADs which have been prepared from Weipa kaolinite using FIG. 10A RbF and FIG. 10B CsF as the reagent according to Example 13, after rinsing with water but before rinsing with KOH. Diffraction peaks due to unreacted kaolinite are indicated by + and the poorly soluble flouride byproducts are indicated by *.
Figure 10B:
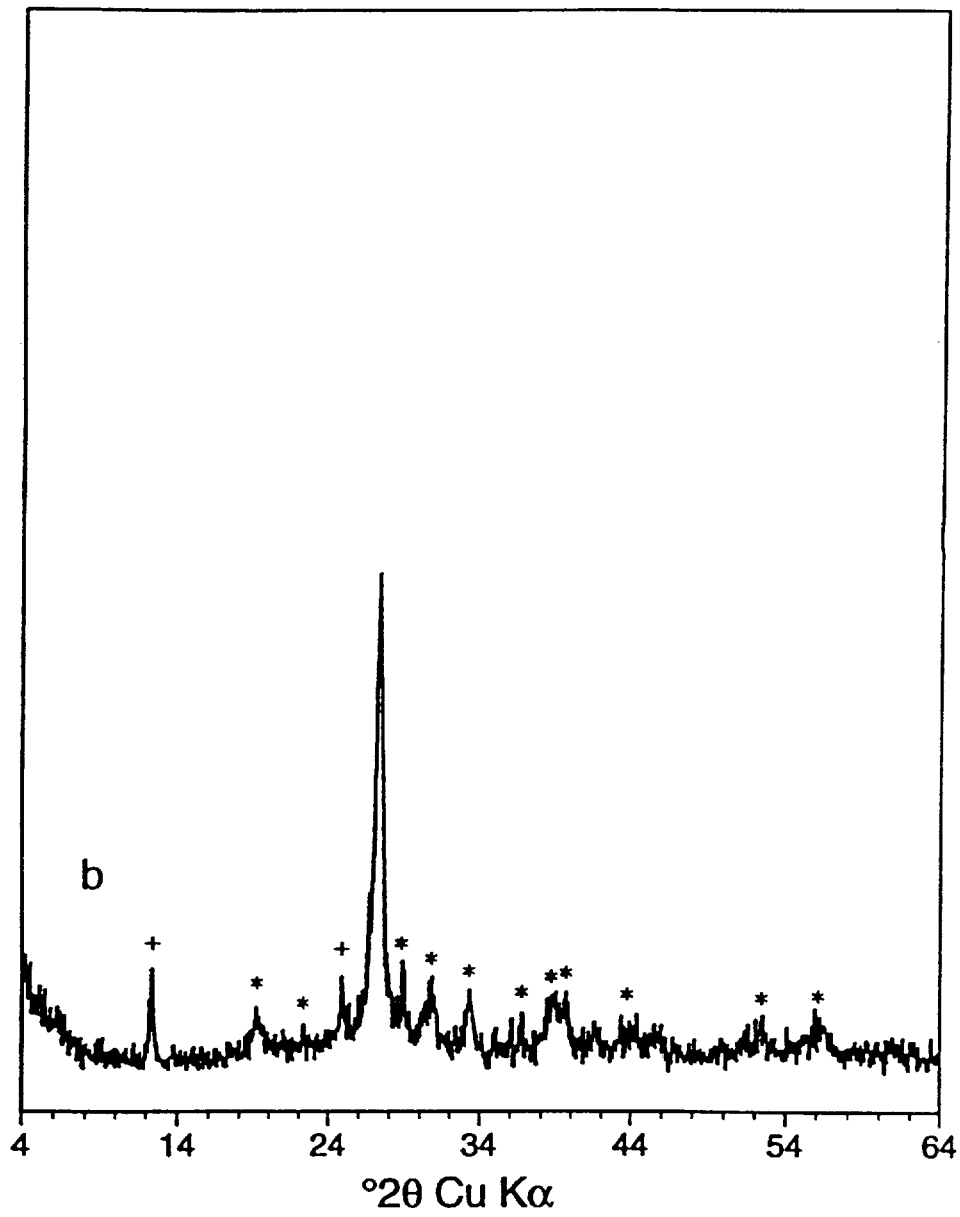

0.5 g of kaolinite obtained from Weipa, Queensland, Australia, and 5.0 g of rubidium fluoride or 7.0 g of cesium fluoride are thoroughly mixed with 1 ml of water. The mixture was heated in an oven at 110° C. for 3.5 hours. The reaction products were then dispersed in 40 ml of distilled water and centrifuged until the solid fraction had completely settled. The elute containing the excess salt and a small amount of the fluoride byproducts was decanted. This rinsing process was repeated, 3 to 4 times, until no further fluoride could be detected in the elute. The remaining solid was dried at 110° C. in air and comprised a mixture of KAD wherein M is Rb or Cs, starting kaolinite and relatively insoluble fluoride byproducts with combined weight of 0.86 g in the case of M=Rb and 0.85 g in the case of M=Cs. FIG. 10 shows the XRD patterns of products for both reactions using either salt. For KAD prepared using RbF, a single broad peak is observed near the center of the broad hump corresponding to a d-spacing of 3.16 (FIG. 10$a$). In the case of KAD prepared using CsF, a similar diffraction pattern is observed, except that the broad hump is weaker and the peak has shifted slightly corresponding to a d-spacing of 3.25 (Figure 10$b$).

KADs which have been exchanged by transition metals or lanthanides with readily accessible lower valence states (e.g. $Cu^{II}$—$Cu^{I}$—$cu^{0}$, $Ni^{II}$—$Ni^{0}$, $Co^{II}$—$Co^{0}$), have been reduced by heating under a stream of hydrogen gas at 400°–500° C. While there is a small degree of unmixing of the metal observable by XRD the majority of the reduced metal remains associated with the KAD. The specific surface of the KADs decreases only slightly upon reduction under these conditions. This subsequent processing of KAD provides an ideal environment for metal-catalysed REDOX reactions with a wide variety of organic compounds. Specific examples of this application are given below.

EXAMPLE 14

Dehydrogenation of methanol to methyl formate using Cu-KAD as catalyst.

Cu—KAD is activated by reducing it overnight under $H_2$ at 400° C. Methanol vapour is passed over the catalyst at 200°–220° C. in a stream of $N_2$. The reaction products and unreacted methanol were trapped using a liquid $N_2$ trap and analysed immediately using $^1H$ NMR spectroscopy. The mole percent of total phases obtained based on the NMR analysis was methanol:methylformate:dimethylether 74:19:7.

EXAMPLE 15

Dehydrogenation of ethanol to acetaldehyde using Cu—KAD as catalyst.

Cu—KAD is activated by reducing it overnight under $H_2$ at 400° C. Ethanol vapour is passed over the catalyst at 300° C. in a stream of $N_2$. The reaction products and unreacted ethanol were trapped using a liquid $N_2$ trap and analysed immediately using $^1H$ NMR spectroscopy. The mole percent of total phases obtained, based on the NMR analysis, was ethanol:acetaldehyde 56:44.

Whilst the above has been given by way of illustrative example of the invention, many modifications and variations may be made thereto by persons skilled in the art without departing from the broad scope and ambit of the invention as herein set forth.

We claim:

1. A high surface area cation exchange material comprising a kaolin amorphous derivative of the formula $M_pAl_qSi_2O_r(OH)_sX_t \cdot uH_2O$, wherein M is an exchangeable alkali metal cation or ammonium cation, X is a halide, $0.5 \leq p \leq 2.0$, $1.0 \leq q \leq 2.2$, $4.5 \leq r \leq 8.0$, $1.0 \leq s \leq 3.0$, $0.0 \leq t \leq 1.0$, and $0.0 \leq u \leq 3.0$, said material having:

(a) a surface area between 45 and 400 $m^2g^{-1}$ as measured by BET isotherm;

(b) an amorphous X-ray diffraction signal with a peak between 14° and 40° 2θ for CuKα radiation;

(c) a primarily tetrahedrally-coordinated Al;

(d) a $^{27}Al$ Magic-Angle Spinning (MAS) Nuclear Magnetic Resonance (NMR) with a dominant peak centered on about 55 ppm relative to $Al(H_2O)_6^{3+}$;

(e) a $^{29}Si$ MAS NMR spectrum having a broad signal (FWHM about 13 ppm) centered on about −86 ppm; and (f) a cation exchange capacity of 50–450 milli-equivalents per 100 grams as measured by exchange of ammonium metal cations from aqueous solution.

2. The cation exchange material of claim 1, wherein the kaolin amorphous derivative has a BET surface area between 100 $m^2g^{-1}$ and 200 $m^2g^{-1}$.

3. The cation exchange material of claim 1, wherein the kaolin amorphous derivative has an M that is $NH_4^+$, $Na^+$, $K^+$, $Li^+$, $Rb^+$, or $Cs^+$ and M is exchanged by $Mg^{2+}$, $Ca^{2+}$, $Sr^{2+}$, $Ba^{2+}$, $Cr^{3+}$, $Mn^{2+}$, $Co^{2+}$, $Ni^{2+}$, $Cu^{2+}$, $Zn^{2+}$, $Ag^+$, $Cd^{2+}$, $Hg^{2+}$, $Pb^{2+}$, $La^{3+}$, $Nd^{3+}$, or $UO_2^+$.

4. The cation exchange material of claim 3, wherein the kaolin amorphous derivative has an M that is $Na^+$, $K^+$, $Li^+$, $Rb^+$, or $Cs^+$ and M is exchanged by $Sr^{2+}$, $Cr^{3+}$, $Co^{2+}$, $Ni^{2+}$, $Cu^{2+}$, $Zn^{2+}$, $Cd^{2+}$, $Pb^{2+}$, $Nd^{3+}$, or $UO_2^+$.

5. The cation exchange material of claim 3, wherein the kaolin amorphous derivative has an M that is $NH_4^+$ and M is exchanged by $Cu^{2+}$.

6. The cation exchange material of claim 1, wherein the cation exchange capacity is about 300 milli-equivalents per 100 grams.

7. The cation exchange material of claim 1, wherein the kaolin amorphous derivative consists essentially of aggregates of anhedral particles of approximate dimensions of about 50 nm.

8. The cation exchange material of claim 1, wherein the kaolin amorphous derivative is combined with an organic polymer or colloidal silica and formed into monolithic shapes.

9. A process for the preparation of the cation exchange material of claim 1, which comprises reacting a kaolin group mineral with a reagent wherein the kaolin group mineral is mixed with an excess of the reagent in solution and heated to a temperature up to 300° C. whereby a majority of octahedrally coordinated aluminum in the kaolin group mineral is connected to tetrahedrally coordinated aluminum.

10. The process of claim 9, wherein the reagent is selected from the group consisting of metal halides and ammonium halides.

11. The process of claim 10, wherein the reagent is an alkali metal halide.

12. The process of claim 11, wherein the alkali metal halide is potassium fluoride.

13. The process of claim 9, which comprises reacting the kaolin group mineral with an aqueous alkali metal halide, wherein the mole ratio of the alkali metal halide to the kaolin group mineral is from 5 to the saturation concentration of the alkali metal halide.

14. The process of claim 13, wherein the mole ratio of the alkali metal halide to the kaolin group mineral is in the range of 15 to 25.

15. The process of claim 9, wherein the kaolin group mineral is kaolinite and the reaction conditions comprise reaction with the alkali metal halide for a time period of up to 100 hours.

16. The process of claim 15, in which the reaction temperature is between 70° C. and 150° C. and the time period of reaction is between 1 minute and 100 hours.

17. A cation exchange process which comprises treating the cation exchange material of claim 1 wherein M is $NH_4^+$, $Na^+$, $K^+$, $Li^+$, $Rb^+$, or $Cs^+$ with a substance that contains at least one of the ions $Mg^{2+}$, $Ca^{2+}$, $Sr^{2+}$, $Ba^{2+}$, $Cr^{3+}$, $Mn^{2+}$ $Co^{2+}$, $Ni^{2+}$, $Cu^{2+}$, $Zn^{2+}$, $Ag^+$, $Cd^{2+}$, $Hg^{2+}$, $Pb^{2+}$, $La^{3+}$, $Nd^{3+}$, and $UO_2^+$, whereby M is exchanged by at least one of said ions.

18. A cation exchange process that comprises treating the cation exchange material of claim 1 with a substance whose rate of reaction is significantly enhanced by treatment with said material.

* * * * *